United States Patent
Ito et al.

(10) Patent No.: US 11,248,079 B2
(45) Date of Patent: Feb. 15, 2022

(54) PHOTOCURABLE RESIN, MIXTURE, AND PHOTOCURABLE RESIN COMPOSITION

(71) Applicant: Sika Hamatite Co., Ltd., Hiratsuka (JP)

(72) Inventors: Tsubasa Ito, Hiratsuka (JP); Takeaki Saiki, Hiratsuka (JP); Kazunori Ishikawa, Hiratsuka (JP)

(73) Assignee: Sika Hamatite Co., Ltd.

( * ) Notice: Subject to any disclaimer, the term of this patent is extended or adjusted under 35 U.S.C. 154(b) by 155 days.

(21) Appl. No.: 16/089,323

(22) PCT Filed: Mar. 29, 2017

(86) PCT No.: PCT/JP2017/012928
§ 371 (c)(1),
(2) Date: Sep. 27, 2018

(87) PCT Pub. No.: WO2017/170706
PCT Pub. Date: Oct. 5, 2017

(65) Prior Publication Data
US 2020/0299446 A1    Sep. 24, 2020

(30) Foreign Application Priority Data
Mar. 31, 2016 (JP) .............................. JP2016-070984

(51) Int. Cl.
| | |
|---|---|
| *C08F 2/46* | (2006.01) |
| *C08F 2/50* | (2006.01) |
| *C08G 61/04* | (2006.01) |
| *C08F 290/06* | (2006.01) |
| *C08F 2/48* | (2006.01) |
| *C08G 18/67* | (2006.01) |
| *C08G 18/69* | (2006.01) |

(52) U.S. Cl.
CPC ............ *C08F 290/067* (2013.01); *C08F 2/48* (2013.01); *C08G 18/672* (2013.01); *C08G 18/69* (2013.01)

(58) Field of Classification Search
CPC ...... C08G 18/672; C08G 18/67; C08G 18/69; C08F 290/067; C08F 290/06; C08F 299/06; C08F 2/48; C08L 75/16
USPC .............. 522/95, 90, 1, 113; 520/1
See application file for complete search history.

(56) References Cited

U.S. PATENT DOCUMENTS

| | | | |
|---|---|---|---|
| 4,104,330 | A | 8/1978 | Denzig et al. |
| 5,565,130 | A | 10/1996 | Omeis et al. |
| 5,597,871 | A | 1/1997 | Auschra et al. |
| 2009/0099283 | A1 | 4/2009 | Ishihara et al. |
| 2013/0165578 | A1 | 6/2013 | Francik et al. |
| 2017/0183440 | A1 | 6/2017 | Mays et al. |

FOREIGN PATENT DOCUMENTS

| | | | |
|---|---|---|---|
| JP | S52-144086 | 12/1977 | |
| JP | S59-075916 | 4/1984 | |
| JP | H02-113008 | 4/1990 | |
| JP | H06-306130 | 11/1994 | |
| JP | 2003-155455 | * 5/2003 | |
| JP | 2008-222743 | 9/2008 | |
| JP | 2013-136746 | 7/2013 | |
| TW | 200740922 | 11/2007 | |
| WO | WO 2007/105713 | 9/2007 | |
| WO | WO-2012024070 A2 | * 2/2012 | ............ C09J 147/00 |
| WO | WO 2014/208212 | 12/2014 | |
| WO | WO-2014208212 A1 | * 12/2014 | .......... C08F 299/065 |
| WO | WO 2015/196093 | 12/2015 | |

OTHER PUBLICATIONS

Matsunami et al, JP 2003155455 Machine Translation, May 30, 2003 (Year: 2003).*
Shimizu et al, WO 2014-208212 Machine Translation, Dec. 31, 2014 (Year: 2014).*
European Office Action for European Application No. 17775240.9 dated Apr. 3, 2020, 6 pages, Germany.
International Search Report for International Application No. PCT/JP2017/012928 dated Jun. 20, 2017, 4 pages, Japan.

* cited by examiner

*Primary Examiner* — Jessica Whiteley
(74) *Attorney, Agent, or Firm* — Thorpe North & Western

(57) ABSTRACT

A photocurable resin of the present technology contains: a main backbone chain having repeating units represented by Formulas (Ia) and (Ib), and a (meth)acryloyl group and a non-photoreactive group at terminals; the non-photoreactive group being at least one type selected from the group consisting of saturated hydrocarbon groups and aromatic hydrocarbon groups which optionally have a heteroatom; a hydroxy group, an amino group, —CH=NH, a carboxy group, or a mercapto group being not bonded to an end of the non-photoreactive group; a content of the repeating unit represented by Formula (Ia) being greater than 15 mol % of an amount of the main backbone chain; and contents of the (meth)acryloyl group and the non-photoreactive group each being 5 mol % or greater of an amount of the ends.

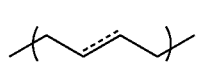

(Ia)

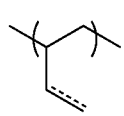

(Ib)

19 Claims, No Drawings

PHOTOCURABLE RESIN, MIXTURE, AND PHOTOCURABLE RESIN COMPOSITION

TECHNICAL FIELD

The present technology relates to a photocurable resin, a mixture, and a photocurable resin composition.

BACKGROUND ART

As protective films or adhesive sheets of various base materials, compositions containing photocurable resins have been used in the related art.

For example, Japan Unexamined Patent Publication No. 2003-155455 discloses an active energy ray curable adhesive composition including a polyisocyanate-based derivative (A) in which an isocyanate group in an isocyanate group-containing compound (a), which is a reaction product of a polyol (a1) and a polyisocyanate (a2), forms urethane bonding with a hydroxy group of a hydroxy group-containing (meth)acrylate (a3) and a hydroxy group of a saturated alcohol (a4); and an ethylenic unsaturated monomer (B), and describes a hydrogenated polybutadiene polyol and the like as a polyol (a1).

In such circumstances, when the inventors of the present technology prepared a photocurable resin by using a hydrogenated polybutadiene polyol and the like in accordance with Japan Unexamined Patent Publication No. 2003-155455 and evaluated the photocurable resin, there were some cases where the adhesiveness after durability test of the composition containing such a photocurable resin was decreased.

SUMMARY

The present technology provides a photocurable resin with excellent adhesiveness.

Furthermore, the present technology provides a mixture and a photocurable resin composition.

The inventors of the present technology found that the desired effects can be achieved by a photocurable resin containing a main backbone chain having a repeating unit with a predetermined structure, containing a (meth)acryloyl group and a predetermined non-photoreactive group at terminals, and having a content of a particular repeating unit, a content of the (meth)acryloyl group, and a content of the non-photoreactive group in predetermined ranges.

The present technology is based on the findings described above and provides the following features.

1. A photocurable resin including: a main backbone chain having repeating units represented by Formulas (Ia) and (Ib), and a (meth)acryloyl group and a non-photoreactive group at terminals;
the non-photoreactive group being at least one type selected from the group consisting of saturated hydrocarbon groups and aromatic hydrocarbon groups which optionally have a heteroatom;
a hydroxy group, an amino group, —CH=NH, a carboxy group, or a mercapto group being not bonded to an end of the non-photoreactive group; a content of the repeating unit represented by Formula (Ia) being greater than 15 mol % of an amount of the repeating units constituting the main backbone chain;
a content of the (meth)acryloyl group being 5 mol % or greater of an amount of the terminals; and
a content of the non-photoreactive group being 5 mol % or greater of the amount of the terminals.

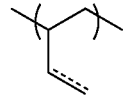

In Formula (Ia) or (Ib), a double line of a dashed line and a solid line represents a single bond or a double bond.

2. The photocurable resin according to 1 above, where the non-photoreactive group is a saturated hydrocarbon group which optionally has an ether bond.

3. The photocurable resin according to 1 or 2 above, where the non-photoreactive group is formed from at least one type of hydroxy compound selected from the group consisting of
a monofunctional alcohol,
a saturated hydrocarbon compound having one hydroxy group and a heteroatom, and
an aromatic hydrocarbon compound having one hydroxy group and optionally having a heteroatom; and
a boiling point of the hydroxy compound is 100° C. or higher, where, the heteroatom does not form a hydroxy group, an amino group, —CH=NH, a carboxy group, or a mercapto group at an end of the saturated hydrocarbon compound or the aromatic hydrocarbon compound.

4. The photocurable resin according to any one of 1 to 3 above, where the content of the repeating unit represented by Formula (Ia) is 35 mol % or less of the amount of the repeating units constituting the main backbone chain.

5. A mixture including:
the photocurable resin described in any one of 1 to 4 above; and
a photocurable resin B including: a main backbone chain having repeating units represented by Formulas (IIa) and (IIb), and a (meth)acryloyl group and a non-photoreactive group at terminals;
the non-photoreactive group being at least one type selected from the group consisting of saturated hydrocarbon groups and aromatic hydrocarbon groups which optionally have a heteroatom;
a hydroxy group, an amino group, —CH=NH, a carboxy group, or a mercapto group being not bonded to an end of the non-photoreactive group;
a content of the repeating unit represented by Formula (IIa) being 15 mol % or less of an amount of the repeating units constituting the main backbone chain;
a content of the (meth)acryloyl group being 5 mol % or greater of an amount of the terminals; and
a content of the non-photoreactive group being 5 mol % or greater of the amount of the terminals.

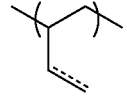

In Formula (IIa) or (IIb), a double line of a dashed line and a solid line represents a single bond or a double bond.

6. A photocurable resin composition including: the photocurable resin described in any one of 1 to 4 above, a monofunctional (meth)acrylate, a photopolymerization initiator, and a plasticizer.

7. The photocurable resin composition according to 6 above, further including a photocurable resin B;

the photocurable resin B including: a main backbone chain having repeating units represented by Formulas (IIa) and (IIb) below, and a (meth)acryloyl group and a non-photoreactive group at terminals;

the non-photoreactive group being at least one type selected from the group consisting of saturated hydrocarbon groups and aromatic hydrocarbon groups which optionally have a heteroatom;

a hydroxy group, an amino group, —CH═NH, a carboxy group, or a mercapto group being not bonded to an end of the non-photoreactive group;

a content of the repeating unit represented by Formula (IIa) being 15 mol % or less of an amount of the repeating units constituting the main backbone chain;

a content of the (meth)acryloyl group being 5 mol % or greater of an amount of the terminals; and a content of the non-photoreactive group being 5 mol % or greater of the amount of the terminals.

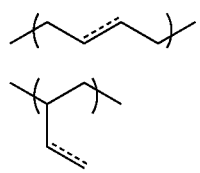

In Formula (IIa) or (IIb), a double line of a dashed line and a solid line represents a single bond or a double bond.

The photocurable resin of an embodiment of the present technology achieves excellent adhesiveness.

Furthermore, the present technology can provide a mixture and a photocurable resin composition that achieve excellent adhesiveness.

DETAILED DESCRIPTION

Embodiments of the present technology are described in detail below.

Note that, in the present specification, (meth)acrylate represents acrylate or methacrylate, (meth)acryloyl represents acryloyl or methacryloyl, and (meth)acryl represents acryl or methacryl.

Furthermore, in the present specification, numerical ranges indicated using "(from) . . . to . . . " include the former number as the lower limit value and the later number as the upper limit value.

In the present specification, unless otherwise noted, a single corresponding substance may be used for each component, or a combination of two or more types of corresponding substances may be used for each component. When a component contains two or more types of substances, the content of the component means the total content of the two or more types of substances.

Photocurable Resin

The photocurable resin of an embodiment of the present technology (resin of an embodiment of the present technology) is a photocurable resin including: a main backbone chain having repeating units represented by Formulas (Ia) and (Ib), and a (meth)acryloyl group and a non-photoreactive group at terminals;

the non-photoreactive group being at least one type selected from the group consisting of saturated hydrocarbon groups and aromatic hydrocarbon groups which optionally have a heteroatom;

a hydroxy group, an amino group, —CH═NH, a carboxy group, or a mercapto group being not bonded to an end of the non-photoreactive group;

the content of the repeating unit represented by Formula (Ia) above being greater than 15 mol % of the amount of the repeating units constituting the main backbone chain;

the content of the (meth)acryloyl group being 5 mol % or greater of the amount of the terminals; and the content of the non-photoreactive group being 5 mol % or greater of the amount of the terminals.

In Formula (Ia) or (Ib), a double line of a dashed line and a solid line represents a single bond or a double bond.

The resin of an embodiment of the present technology is thought to achieve desired effects as a result of having such a configuration. Although the reason is not clear, it is assumed to be as follows.

The resin of an embodiment of the present technology contains a large amount of the repeating unit represented by Formula (Ia) above and has a high degree of crystallinity, and it is conceived that the resin is less likely to be affected by external influences, such as a high temperature and high humidity. It is therefore presumed that high adhesiveness can be maintained even after durability test because the content of the repeating unit represented by Formula (Ia) above is in a predetermined range.

Furthermore, it is conceived that the resin of an embodiment of the present technology has a non-photoreactive group at a terminal, and because no photoreaction takes place at the terminal, flexibility can be imparted to a cured product obtained after curing. Furthermore, in the resin of an embodiment of the present technology, it is conceived that the end of the non-photoreactive group does not bond to a hydroxy group, an amino group, —CH═NH, a carboxy group, or a mercapto group, and reactions do not occur at the end, and thus flexibility can be imparted to a cured product obtained after curing. It is presumed that the resin of an embodiment of the present technology achieves excellent adhesiveness due to such flexibility.

The resin of an embodiment of the present technology is described in detail below.

Main Backbone Chain

The main backbone chain of the resin of an embodiment of the present technology has repeating units represented by Formulas (Ia) and (Ib) described below.

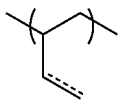 (Ib)

In Formula (Ia) or (Ib), a double line of a dashed line and a solid line represents a single bond or a double bond.

In an embodiment of the present technology, the content of the repeating units represented by Formula (Ia) is greater than 15 mol % of the amount of the repeating units constituting the main backbone chain of the resin of an embodiment of the present technology. From the perspective of achieving superior adhesiveness and excellent weather resistance, the content of the repeating unit represented by Formula (Ia) is preferably 40 mol % or less, and more preferably from 25 to 35 mol %, of the amount of the repeating units constituting the main backbone chain of the resin.

In an embodiment of the present technology, microstructures of the main backbone chain is influenced by microstructures of a raw material polymer of the main backbone chain (e.g. (hydrogenated) polybutadiene having a functional group at a terminal).

Microstructures of an (unhydrogenated) raw material polymer of the main backbone chain (e.g. polybutadiene having a functional group at a terminal) can be calculated by infrared absorption spectroscopy. Specifically, the microstructures of the main backbone chain can be calculated from the absorption intensity ratio of the peak positions derived from the microstructures (cis: 740 cm$^{-1}$, vinyl: 910 cm$^{-1}$, trans: 967 cm$^{-1}$).

The microstructures of the raw material polymer (hydrogenated product) of the main backbone chain (e.g. hydrogenated polybutadiene having a functional group at a terminal) can be taken as being the same as the microstructures of the polymer that has been used as a raw material for hydrogenation (e.g. polybutadiene having a functional group at a terminal).

Terminal

The resin of an embodiment of the present technology has a (meth)acryloyl group and a non-photoreactive group at terminals, and the non-photoreactive group is at least one type selected from the group consisting of saturated hydrocarbon groups and aromatic hydrocarbon groups which may have a heteroatom.

Note that, a hydroxy group, an amino group, —CH=NH, a carboxy group, or a mercapto group does not bond to an end of the non-photoreactive group.

In an embodiment of the present technology, the non-photoreactive group means a group that is non-reactive with light.

Furthermore, in an embodiment of the present technology, the photoreactive group means a group that is reactive with light. Examples of the photoreactive group include groups having an ethylenically unsaturated bond, such as a (meth) acryloyl group, a (meth)acryloyloxy group, and a vinyl group.

Note that, in an embodiment of the present technology, the terminal means a terminal of the main backbone chain or the resin of an embodiment of the present technology. Furthermore, the terminal does not include the ethyl group or the vinyl group in Formula (Ib) above.

The resin of an embodiment of the present technology may have a plurality of terminals. An example of a preferable aspect is one in which the resin of an embodiment of the present technology has two terminals.

An example of a preferable aspect is one in which one of the terminals has a (meth)acryloyl group or a non-photoreactive group.

In the present technology, the end of the non-photoreactive group is synonymous with the terminal of the resin of an embodiment of the present technology.

The (meth)acryloyl group or the non-photoreactive group may be bonded to a terminal of the main backbone chain directly or via an organic group.

The organic group is not limited. Examples of the organic group include a urethane bond, an ester bond, and a hydrocarbon group. An example of a preferable aspect is one in which the organic group has a hydrocarbon group that bonds to at least one type selected from the group consisting of a urethane bond and an ester bond.

The hydrocarbon group is not limited. The hydrocarbon group may have an unsaturated bond. The hydrocarbon group may be di- or higher valent. Examples of the hydrocarbon group include saturated hydrocarbon groups, aromatic hydrocarbon groups, and combinations thereof. The saturated hydrocarbon group may be a straight-chain, branched-chain, or cyclic saturated hydrocarbon group.

(Meth)Acryloyl Group

The resin of an embodiment of the present technology has photocurability (photoreactivity) due to the contained (meth)acryloyl group.

In the present technology, "(meth)acryloyl group" includes a (meth)acryloyloxy group.

Non-Photoreactive Group

In an embodiment of the present technology, the non-photoreactive group is at least one type selected from the group consisting of saturated hydrocarbon groups (including a straight-chain, branched-chain, or cyclic) and aromatic hydrocarbon groups that may have a heteroatom.

Note that, a hydroxy group, an amino group, —CH=NH, a carboxy group, or a mercapto group does not bond to an end of the non-photoreactive group.

It is possible that a hydroxy group, an amino group, —CH=NH, a carboxy group, or a mercapto group does not bond to the entire non-photoreactive group.

The non-photoreactive group may be at least one type selected from the group consisting of saturated hydrocarbon groups and aromatic hydrocarbon groups that do not have a heteroatom. In this case, the non-photoreactive group is at least one type selected from the group consisting of unsubstituted saturated hydrocarbon groups and unsubstituted aromatic hydrocarbon groups.

When the non-photoreactive group is at least one type selected from the group consisting of saturated hydrocarbon groups and aromatic hydrocarbon groups which have a hetero atom, flexibility can be further enhanced to a cured product obtained after curing.

The heteroatom is not limited. Examples of the heteroatom include an oxygen atom, a nitrogen atom, and a sulfur atom.

When the non-photoreactive group is at least one type selected from the group consisting of saturated hydrocarbon groups and aromatic hydrocarbon groups which have a hetero atom, one or a plurality of discretionary chosen carbon atoms contained in the saturated hydrocarbon groups or the aromatic hydrocarbon groups (except the carbon atom(s) at the terminal(s) of the saturated hydrocarbon group as the non-photoreactive group) can be substituted with the heteroatom(s).

When the non-photoreactive group has a saturated hydrocarbon group having a heteroatom and discretionary chosen carbon atom(s) contained in the saturated hydrocarbon group (except the carbon atom(s) at terminal(s) of the saturated hydrocarbon group) is substituted with the heteroatom(s), the end of the terminal side of the resin rather than the heteroatom side (the end of the non-photoreactive group side in the resin of an embodiment of the present technology) in the non-photoreactive group is preferably an unsubstituted alkyl group (straight-chain, branched-chain, cyclic, or a combination thereof).

An example of a preferable aspect is one in which the heteroatom is bonded to at least two carbon atoms constituting the saturated hydrocarbon group or the aromatic hydrocarbon group.

In the saturated hydrocarbon group or the aromatic hydrocarbon group, the hetero atom can form, for example, an ether bond, a tertiary amine bond (three carbon atoms are bonded to one nitrogen atom), a thioether bond, a carbonyl bond, an ester bond, or a urethane bond.

The non-photoreactive group may have, for example, at least one type selected from the group consisting of an ether bond, a tertiary amine bond, a thioether bond, a carbonyl bond, an ester bond, and a urethane bond.

When the non-photoreactive group has a heteroatom, the non-photoreactive group is preferably a saturated hydrocarbon group that may have at least one type selected from the group consisting of an ether bond, a tertiary amine bond, a thioether bond, a carbonyl bond, an ester bond, and a urethane bond, and more preferably a saturated hydrocarbon group that may have an ether bond, from the perspectives of enhancing flexibility and achieving superior adhesiveness and excellent weather resistance.

The saturated hydrocarbon group (when the saturated hydrocarbon group has a heteroatom, hereinafter, "number of carbons" indicates the total number of the heteroatom(s) and the carbon(s)) preferably has 4 or more carbons from the perspectives of enhancing flexibility and achieving superior adhesiveness and excellent weather resistance. From the perspectives of enhancing flexibility and achieving superior adhesiveness and excellent weather resistance, the saturated hydrocarbon group preferably has 30 or less carbons, and more preferably from 4 to 20 carbons.

Examples of the saturated hydrocarbon group include a butyl group, a pentyl group, a hexyl group, a heptyl group, an octyl group, a nonyl group, and a decyl group. The saturated hydrocarbon group may be a straight-chain, branched-chain, or cyclic saturated hydrocarbon group. In the saturated hydrocarbon group, a discretionary chosen carbon atom may be substituted with a heteroatom.

Examples of the branched-chain saturated hydrocarbon group include an ethylhexyl group and an isostearyl group. In the branched-chain saturated hydrocarbon group, a discretionary chosen carbon atom may be substituted with a heteroatom.

Examples of the saturated hydrocarbon group having a heteroatom include alkoxy alkyl groups, such as a butoxyethyl group and a butoxypropyl group, and polyoxyalkylene groups with a terminal capped with an alkyl group, such as an ethoxyethoxyethyl group.

Examples of the aromatic hydrocarbon group include a phenyl group.

Examples of a combination of a saturated hydrocarbon group and an aromatic hydrocarbon group include a tolyl group. In the combination, a discretionary chosen carbon atom may be substituted with a heteroatom.

Examples of the combination of the saturated hydrocarbon group and the aromatic hydrocarbon group, which has a heteroatom, include alkoxyphenyl groups, such as a methoxyphenyl group; oxyalkylene groups capped with an aromatic hydrocarbon group, such as a 2-phenoxyethyl group; polyoxyalkylene groups capped with an aromatic hydrocarbon group, such as 2-(2-phenoxyethoxy)ethyl group.

When the non-photoreactive group is formed from a saturated hydrocarbon having 4 or more carbons, it is conceived that flexibility is enhanced and superior adhesiveness is achieved.

The non-photoreactive group can be formed from at least one type of hydroxy compound selected from the group consisting of
a monofunctional alcohol (an aliphatic hydrocarbon compound having one hydroxy group (saturated hydrocarbon compound)),
a saturated hydrocarbon compound having one hydroxy group and a heteroatom (except the oxygen atom constituting the one hydroxy group; hereinafter the same), and
an aromatic hydrocarbon compound having one hydroxy group and optionally having a heteroatom (except the oxygen atom constituting the one hydroxy group; hereinafter the same).

However, in the end of the saturated hydrocarbon compound or the aromatic hydrocarbon compound (the end is another end that is different from one hydroxy group in the monofunctional alcohol, the saturated hydrocarbon compound, or the aromatic hydrocarbon compound), the heteroatom does not form a hydroxy group, an amino group, —CH=NH, a carboxy group, or a mercapto group.

Furthermore, the one hydroxy group contained in the monofunctional alcohol, the saturated hydrocarbon compound, or the aromatic hydrocarbon compound is consumed to bond the main backbone chain and the non-photoreactive group, and thus the resin of an embodiment of the present technology does not contain a hydroxy group derived from the one hydroxy group. Furthermore, the hydroxy group derived from the one hydroxy group does not become a hydroxy group that bonds to the end of the non-photoreactive group.

The boiling point of the hydroxy compound is preferably 100° C. or higher, more preferably from 100 to 350° C., and even more preferably from 100 to 250° C.

When the non-photoreactive group is formed by a hydroxy compound having a boiling point of 100° C. or higher, since the hydroxy compound is less likely to be volatilized and the hydroxy compound can be sufficiently reacted with an isocyanate group to reduce residual isocyanate during the production of the resin of an embodiment of the present technology, it is conceived that discoloration is less likely to occur and excellent weather resistance is achieved.

Furthermore, an example of a preferable aspect is one in which the non-photoreactive group is formed from a monofunctional alcohol having a boiling point of 100° C. or higher.

When the non-photoreactive group is formed from a monofunctional alcohol having a boiling point of 100° C. or higher, since the monofunctional alcohol is less likely to be volatilized and the monofunctional alcohol can be sufficiently reacted with an isocyanate group to reduce residual isocyanate during the production of the resin of an embodiment of the present technology, it is conceived that discoloration is less likely to occur and excellent weather resistance is achieved.

The monofunctional alcohol is an aliphatic hydrocarbon compound having one hydroxy group (saturated hydrocarbon compound). The aliphatic hydrocarbon group contained in the monofunctional alcohol is synonymous with the saturated hydrocarbon group that may be contained in the non-photoreactive group.

The boiling point of the monofunctional alcohol is preferably from 100 to 350° C., and more preferably from 100 to 250° C.

Examples of the monofunctional alcohol having a boiling point of 100° C. or higher include butanol, pentanol, hexanol, heptanol, octanol, ethylhexanol, and decanol.

In the saturated hydrocarbon compound having one hydroxy group and a heteroatom, the heteroatom contained in the saturated hydrocarbon compound is synonymous with the heteroatom that may be contained in the non-photoreactive group. The saturated hydrocarbon group contained in the saturated hydrocarbon compound is synonymous with the saturated hydrocarbon group that may be contained in the non-photoreactive group.

Examples of the saturated hydrocarbon compound having the boiling point of 100° C. or higher, having one hydroxy group and a heteroatom include alkylene glycol monoalkyl ethers, such as ethylene glycol monobutyl ether and butoxy propanol; and polyalkylene glycol monoalkyl ethers, such as diethylene glycol monoethyl ether.

In the aromatic hydrocarbon compound having one hydroxy group and a heteroatom, the heteroatom that may be contained in the aromatic hydrocarbon compound is synonymous with the heteroatom that may be contained in the non-photoreactive group. The aromatic hydrocarbon group contained in the aromatic hydrocarbon compound is synonymous with the aromatic hydrocarbon group that may be contained in the non-photoreactive group.

In an embodiment of the present technology, the content of the (meth)acryloyl group is 5 mol % or greater of the amount of the ends.

Note that, in an embodiment of the present technology, the amount of the ends indicates the total amount of the ends contained in one molecule of the resin of an embodiment of the present technology, or the total amount of the ends in the entire resin of an embodiment of the present technology (hereinafter the same).

The content of the (meth)acryloyl group is preferably from 10 to 95 mol %, and more preferably from 40 to 90 mol %, of the amount of the ends from the perspective of achieving superior adhesiveness and excellent weather resistance.

In an embodiment of the present technology, the content of the (meth)acryloyl group relative to the amount of the ends of the main backbone chain (or the ends of the resin of an embodiment of the present technology) may be a molar ratio of the amount of the compound used to introduce the (meth)acryloyl group to the amount of ends of the main backbone chain or a molar ratio of the amount of the compound for introducing the (meth)acryloyl group to the total amount of the compound used to introduce the (meth)acryloyl group and the compound used to introduce the non-photoreactive group.

In an embodiment of the present technology, the content of the non-photoreactive group is 5 mol % or greater of the amount of the ends.

The content of the non-photoreactive group is preferably from 5 to 90 mol %, and more preferably from 10 to 60 mol %, of the amount of the ends from the perspective of achieving superior adhesiveness and excellent weather resistance.

In an embodiment of the present technology, the content of the non-photoreactive group relative to the ends of the main backbone chain (or the ends of the resin of an embodiment of the present technology) may be a molar ratio of the amount of the compound used to introduce the non-photoreactive group to the amount of ends of the main backbone chain or a molar ratio of the amount of the compound used to introduce the non-photoreactive group to the total amount of the compound used to introduce the (meth)acryloyl group and the compound used to introduce the non-photoreactive group.

Examples of the resin of an embodiment of the present technology include a compound represented by Formula (1) below.

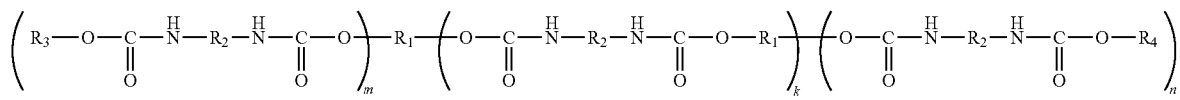

(1)

In Formula (1), $R_1$ each independently represents a main backbone chain, $R_2$ each independently represents an organic group, $R_3$ represents an organic group having a (meth)acryloyl group, $R_4$ represents a non-photoreactive group, m is from 1 to 9, n is from 1 to 9, and k is 0 or 1 to 10.

The main backbone chain, the organic group, the (meth)acryloyl group, the organic group bonded to the (meth)acryloyl group, and the non-photoreactive group are each synonymous with those described above.

The method of producing the resin of an embodiment of the present technology is not particularly limited. For example, a photocurable resin can be produced by mixing and reacting a polyisocyanate with a polybutadiene capped with functional group(s) or a hydrogenated polybutadiene capped with functional group(s) (e.g. polybutadiene capped with hydroxy group(s) or hydrogenated polybutadiene capped with hydroxy group(s)) in which the main backbone chain has repeating units represented by Formulas (Ia) and (Ib) above, which has a functional group (e.g. hydroxy group) at a terminal, and the content of the repeating unit represented by Formula (Ia) is greater than 15 mol % of the amount of the repeating units constituting the main backbone chain to obtain a urethane prepolymer having an isocyanate group at a terminal; adding, to the urethane prepolymer, a compound having a hydroxy group and a (meth)acryloyl group and the hydroxy compound (e.g. monofunctional alcohol); and allowing these to react.

Furthermore, as another production method that is different from the method described above, for example, a photocurable resin can be produced by mixing and reacting a polyisocyanate with a polybutadiene capped with functional group(s) or a hydrogenated polybutadiene capped with functional group(s) (e.g. polybutadiene capped with hydroxy group(s) or hydrogenated polybutadiene capped with hydroxy group(s)) in which the main backbone chain has repeating units represented by Formulas (Ia) and (Ib) above, which has a functional group at a terminal (e.g. hydroxy group), and the content of the repeating unit represented by Formula (Ia) is greater than 15 mol % of the amount of the repeating units constituting the main backbone chain to obtain a urethane polymer having a hydroxy group at a terminal; adding, to the urethane polymer, a compound obtained by reacting a polyisocyanate, a compound having a hydroxy group and (meth)acrylate, and the hydroxy compound described above (e.g. monofunctional alcohol) in advance (NCO/OH (molar ratio) during the reaction is preferably 2/1); and allowing these to react.

For example, to the urethane prepolymer described above, a compound obtained by reacting a polyisocyanate with a compound having a hydroxy group and (meth)acrylate (NCO/OH (molar ratio) during the reaction is preferably 2/1), and a compound obtained by reacting a polyisocyanate with the hydroxy compound described above (e.g. monofunctional alcohol) (NCO/OH (molar ratio) during the reaction is preferably 2/1) can be added.

Each of the raw materials used during the production of the resin of an embodiment of the present technology is not particularly limited except the description above. The raw material can be selected as appropriate depending on the structure of the resin of an embodiment of the present technology. The amount of the raw material to be used can be selected appropriately so that a target compound can be obtained.

Note that the resin of an embodiment of the present technology may contain a resin having a different content of the (meth)acryloyl group or the non-photoreactive group.

Examples of a functional group contained in the polybutadiene capped with the functional group(s) or the hydrogenated polybutadiene capped with the functional group(s) used in the two production methods described above include a hydroxy group, an amino group, a carboxy group, and a mercapto group.

Furthermore, an example of a preferable aspect is one in which at least two ends of the polybutadiene capped with the functional group(s) or the hydrogenated polybutadiene capped with the functional group(s) each have a functional group. The functional groups may be functional groups of the same type or different types.

Furthermore, the polyisocyanate used in the method of producing the resin of an embodiment of the present technology is not particularly limited as long as the polyisocyanate is a compound having a plurality of isocyanate groups. Examples thereof include aromatic polyisocyanates, such as tolylene diisocyanate (TDI), diphenylmethane diisocyanate, 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates (including alicyclic polyisocyanates), such as hexamethylene diisocyanate (HDI), trimethylhexamethylene diisocyanate (TMHDI), lysine diisocyanate, and norbornane diisocyanate (NBDI), transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates thereof; and isocyanurate-modified polyisocyanates thereof.

The hydroxy compound used during the production of the resin of an embodiment of the present technology is synonymous with a hydroxy compound that can form the non-photoreactive group.

Examples of the compound having a hydroxy group and a (meth)acryloyl group used in the method of producing the resin of an embodiment of the present technology include compounds having one hydroxy group and a (meth)acryloyl group. The hydroxy group and the (meth)acryloyl group can be bonded to an organic group. The organic group is not limited. Examples of the compound include hydroxyalkyl (meth)acrylates, such as hydroxyethyl (meth)acrylate and hydroxybutyl (meth)acrylate.

Mixture

The mixture of an embodiment of the present technology is a mixture including:

a photocurable resin of an embodiment of the present technology; and a photocurable resin B including:

a main backbone chain having repeating units represented by Formulas (IIa) and (IIb) below, and a (meth)acryloyl group and a non-photoreactive group at terminals;

the non-photoreactive group being at least one type selected from the group consisting of saturated hydrocarbon groups and aromatic hydrocarbon groups which optionally have a heteroatom;

a hydroxy group, an amino group, —CH=NH, a carboxy group, or a mercapto group being not bonded to an end of the non-photoreactive group;

the content of the repeating unit represented by Formula (IIa) above being 15 mol % or less of the amount of the repeating units constituting the main backbone chain;

the content of the (meth)acryloyl group being 5 mol % or greater of the amount of the terminals; and the content of the non-photoreactive group being 5 mol % or greater of the amount of the terminals.

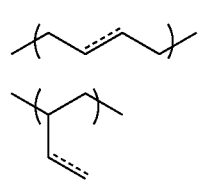

In Formula (IIa) or (IIb), a double line of a dashed line and a solid line represents a single bond or a double bond.

Photocurable Resin A

The photocurable resin contained in the mixture of an embodiment of the present technology is not particularly limited as long as the photocurable resin is the photocurable resin of an embodiment of the present technology.

Note that, in the present specification, the photocurable resin of an embodiment of the present technology is also referred to as "photocurable resin A".

Photocurable Resin B

The photocurable resin B contained in the mixture of an embodiment of the present technology may be the same as the photocurable resin A except for the content of the repeating unit represented by Formula (IIa) being 15 mol % or less of the amount of the repeating units constituting the main backbone chain. Note that the structure of Formula (IIa) is the same as the structure of Formula (Ia) above, and the structure of Formula (IIb) is the same as the structure of Formula (Ib) above.

From the perspective of achieving superior adhesiveness and excellent weather resistance, the content of the repeating unit represented by Formula (IIa) is preferably 15 mol % or less, and more preferably from 1 to 15 mol %, of the amount of the repeating units constituting the main backbone chain.

From the perspective of achieving superior adhesiveness and excellent weather resistance, the content of the repeating unit represented by Formula (IIb) is preferably 85 mol % or greater, and more preferably from 85 to 99 mol %, of the amount of the repeating units constituting the main backbone chain.

The content of the photocurable resin B is preferably 30 mass % or less, and more preferably from 1 to 30 mass %, relative to the content of the photocurable resin A from the perspective of achieving superior adhesiveness and excellent weather resistance.

The method of producing the mixture of an embodiment of the present technology is not particularly limited. For example, in the method of producing the resin of an embodiment of the present technology, the mixture of an embodiment of the present technology can be produced by the same manner as in the method of producing the resin of an embodiment of the present technology except for further using, in addition to the polybutadiene capped with functional group(s) or the hydrogenated polybutadiene capped with functional group(s) (e.g. polybutadiene capped with hydroxy group(s) or hydrogenated polybutadiene capped with hydroxy group(s)), a polybutadiene capped with functional group(s) or a hydrogenated polybutadiene capped with functional group(s) (e.g. polybutadiene capped with hydroxy group(s) or hydrogenated polybutadiene capped with hydroxy group(s)) in which the main backbone chain has repeating units represented by Formulas (Ia) (=Formula (IIa)) and (Ib) (=Formula (IIb)), which has a functional group such as a hydroxy group at a terminal, and the content of the repeating unit represented by Formula (Ia) (=Formula (IIa)) is 15 mol % or less of the amount of the repeating units constituting the main backbone chain.

Photocurable Resin Composition

The photocurable resin composition of an embodiment of the present technology (composition of an embodiment of the present technology) is a photocurable resin composition containing the photocurable resin of an embodiment of the present technology, a monofunctional (meth)acrylate, a photopolymerization initiator, and a plasticizer.

Photocurable Resin

The photocurable resin contained in the composition of an embodiment of the present technology is not particularly limited as long as the photocurable resin is the photocurable resin (photocurable resin A) of an embodiment of the present technology.

Monofunctional (Meth)Acrylate

The monofunctional (meth)acrylate contained in the composition of an embodiment of the present technology is not particularly limited as long as the monofunctional (meth) acrylate is a compound having one (meth)acryloyloxy group. The (meth)acryloyloxy group can be bonded to an organic group. The organic group is not limited.

Specific examples of the monofunctional (meth)acrylate include methyl (meth)acrylate, ethyl (meth)acrylate, butyl (meth)acrylate, cyclohexyl (meth)acrylate, benzyl (meth) acrylate, carbitol (meth)acrylate, 2-ethylhexyl (meth)acrylate, glycidyl (meth)acrylate, lauryl (meth)acrylate, tridecyl (meth)acrylate, stearyl (meth)acrylate, ethoxyethyl (meth) acrylate, methoxyethyl (meth)acrylate, allyl (meth)acrylate, 3-methoxybutyl (meth)acrylate, isooctyl (meth)acrylate, phenoxyethyl (meth)acrylate, dicyclopentenyl (meth)acrylate, isobornyl (meth)acrylate, and isodecyl (meth)acrylate.

From the perspective of achieving superior adhesiveness and excellent weather resistance, the monofunctional (meth) acrylate is preferably a compound that may have an unsaturated bond and that has at least one type selected from the group consisting of alicyclic hydrocarbon groups and open-chain hydrocarbon groups, and more preferably at least one type selected from the group consisting of dicyclopentenyl (meth)acrylate, isobornyl (meth)acrylate, and isodecyl (meth)acrylate.

When 100 parts by mass of the photocurable resin A is contained or when the composition of an embodiment of the present technology further contains the photocurable resin B, the content of the monofunctional (meth)acrylate is preferably from 5 to 50 parts by mass, and more preferably from 10 to 30 parts by mass, per 100 parts by mass total of the photocurable resin A and the photocurable resin B (hereinafter, these are also referred collectively as "100 parts by mass of the photocurable resin A and the like").

Photopolymerization initiator Examples of the photopolymerization initiator include carbonyl compounds, such as alkylphenone-based compounds, benzoin ether-based compounds, and benzophenone-based compounds, sulfur compounds, azo compounds, peroxide compounds, phosphine and oxide-based compounds.

Specific examples include carbonyl compounds, such as acetophenone, benzoin, benzoin methyl ether, benzoin ethyl ether, benzoin isopropyl ether, acetoin, butyroin, toluoin, benzyl, benzophenone, p-methoxybenzophenone, diethoxy-acetophenone, α, α-dimethoxy-α-phenylacetophenone, methylphenylglyoxylate, ethylphenylglyoxylate, 4,4'-bis(di-methylaminobenzophenone), 2-hydroxy-2-methyl-1-phenylpropan-1-one, and 1-hydroxycyclohexyl phenyl ketone; sulfur compounds, such as tetramethylthiuram monosulfide and tetramethylthiuram disulfide; azo compounds, such as azobisisobutyronitrile, azobis-2,4-dimethylvalero; and peroxide compounds, such as benzoyl peroxide and di-tert-butyl peroxide. One type of these may be used alone, or two or more types of these may be used in combination.

Among these, 1-hydroxycyclohexyl phenyl ketone, 2-hydroxy-2-methyl-1-phenylpropan-1-one, and 1-[4-(2-hydroxyethoxy)-phenyl]-2-hydroxy-2-methyl-1-propan-1-one are preferable.

Examples of the commercially available product of the 1-hydroxycyclohexyl phenyl ketone include IRGACURE 184 (available from Ciba Specialty Chemicals).

The content of the photopolymerization initiator is preferably from 1 to 10 parts by mass, and more preferably from 2 to 8 parts by mass, per 100 parts by mass of the photocurable resin A and the like.

Plasticizer

The plasticizer contained in the composition of an embodiment of the present technology is not particularly limited. An example of a preferable aspect is a plasticizer that is in a liquid form at room temperature.

Specific examples of the compound include esters of polyoxyalkylene polyols, such as polyethylene glycol di-2-ethylhexanoate; and polyolefins, such as polyethylene wax.

The content of the plasticizer is preferably from 5 to 100 parts by mass, and more preferably from 10 to 30 parts by mass, per 100 parts by mass of the photocurable resin A and the like.

Photocurable Resin B

The composition of an embodiment of the present technology may further contain a photocurable resin B.

The photocurable resin B that may be further contained in the composition of an embodiment of the present technology is the same as the photocurable resin B contained in the mixture of an embodiment of the present technology.

Additives

The composition of an embodiment of the present technology may further contain an additive in a range that does not inhibit the present technology. Examples of the additive include polymers except the photocurable resins A and B, fillers, anti-aging agents, antioxidants, antistatic agents, flame retardants, adhesion-imparting agents, leveling agents, dispersants, antifoaming agents, matting agents, photostabilizers (e.g. hindered amine-based compounds and the like), dyes, and pigments.

Production Method

The method of producing the composition of an embodiment of the present technology is not particularly limited. For example, the composition of an embodiment of the present technology can be produced by a method in which each of the necessary components and the optional components described above are mixed under reduced pressure by using a mixer such as a combination mixer, or the like.

The composition of an embodiment of the present technology can be cured by, for example, light. The light with which the composition of an embodiment of the present technology is irradiated is not particularly limited. Examples thereof include ultraviolet rays.

When the composition of an embodiment of the present technology is irradiated with the light, the wavelength of the light may be from 200 to 400 nm. The quantity of light may be from 100 to 300 mW/cm$^2$, and integrated quantity of light may be from 1000 to 3000 mJ/cm$^2$.

The device used for light irradiation is not particularly limited.

The temperature conditions during curing of the composition of an embodiment of the present technology is not particularly limited. For example, the temperature may be from 0 to 150° C.

The composition of an embodiment of the present technology can be used as, for example, an adhesive or a coating material.

The base material (adherend) to which the composition of an embodiment of the present technology can be applied is not particularly limited. Examples thereof include glass, plastic, rubber, and metal.

As a specific example, the composition of an embodiment of the present technology may be an optical clear resin (OCR). The OCR can be bonded to, for example, a cover glass of a touchscreen, a transparent electrically conductive material, a liquid crystal module, and the like.

EXAMPLES

The present technology is described below in detail using examples but the present technology is not limited to such examples.

Production of Resin of the Present Technology

Photocurable Resin A-1

To 100 parts by mass of a hydrogenated polybutadiene capped with a hydroxy group 1 (a straight-chain polymer in which the main backbone chain had the repeating units represented by Formulas (Ia) and (Ib) above, the double line of a dashed line and a solid line was a single bond in Formulas (Ia) and (Ib), and the content of the repeating unit represented by Formula (Ia) was 35 mol % of the amount of the repeating units constituting the main backbone chain, and which had hydroxy groups at both terminals; trade name: HLBH-P2000, available from Cray Valley; hereinafter the same), 12.9 parts by mass of isophorone diisocyanate (available from Evonik; hereinafter the same) was mixed and reacted in a nitrogen atmosphere at 70° C. for 5 hours to obtain a urethane prepolymer having isocyanate groups at both terminals. When the residual amount of NCO became 0.99%, to the urethane prepolymer, 3.08 parts by mass of 4-hydroxybutyl acrylate (4-HBA; available from Osaka Organic Chemical Industry Ltd.; hereinafter the same) and 0.39 parts by mass of butanol (available from Tokyo Chemical Industry Co., Ltd.; boiling point: 117° C.) were added and reacted in the condition at 70° C. for 5 hours. When the amount of residual isocyanate became 0.1% or less, the reaction was terminated to obtain a photocurable resin A-1.

In the photocurable resin A-1, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a butyl group at another terminal, the content of the repeating unit represented by Formula (Ia) was 35 mol % of the amount of the repeating units constituting the main backbone chain, the content of the (meth)acryloyl group was 80 mol % of the amount of the terminals, and the content of the butyl group was 20 mol % of the amount of the terminals.

Photocurable Resin A-2

To 10 parts by mass of isophorone diisocyanate, 5.19 parts by mass of 4-HBA and 0.67 parts by mass of butanol were added and reacted at 70° C. for 3 hours to obtain an adduct body having an NCO group at one terminal.

To 100 parts by mass of a hydrogenated polybutadiene capped with a hydroxy group 1, 6.59 parts by mass of isophorone diisocyanate was mixed and reacted in a nitrogen atmosphere at 70° C. for 5 hours to obtain a urethane polymer having hydroxy groups at both terminals. When the residual amount of NCO became 0.1% or less, 10.45 parts by mass of the adduct body was added and reacted in the condition at 70° C. for 5 hours. When the amount of residual isocyanate became 0.1% or less, the reaction was terminated to obtain a photocurable resin A-2.

In the photocurable resin A-2, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a butyl group at another terminal, the content of the repeating unit represented by Formula (Ia) was 35 mol % of the amount of the repeating units constituting the main backbone chain, the content of the (meth)acryloyl group was 80 mol % of the amount of the terminals, and the content of the butyl group was 20 mol % of the amount of the terminals.

Photocurable Resin A-3

To 100 parts by mass of a hydrogenated polybutadiene capped with a hydroxy group 1, 12.9 parts by mass of isophorone diisocyanate was mixed and reacted in a nitrogen atmosphere at 70° C. for 5 hours to obtain a urethane prepolymer having isocyanate groups at both terminals. When the residual amount of NCO became 0.99%, to the urethane prepolymer, 3.08 parts by mass of 4-HBA and 0.8 parts by mass of 2-ethylhexanol (available from Tokyo Chemical Industry Co., Ltd.; boiling point: 187° C.) were added and reacted in the condition at 70° C. for 5 hours. When the amount of residual isocyanate became 0.1% or less, the reaction was terminated to obtain a photocurable resin A-3.

In the photocurable resin A-3, the main backbone chain had the repeating units represented by Formulas (Ia) and (Ib)

above (the double line of a dashed line and a solid line was a single bond in Formulas (Ia) and (Ib)), had a (meth) acryloyl group at one terminal and had a 2-ethylhexyl group at another terminal, the content of the repeating unit represented by Formula (Ia) was 35 mol % of the amount of the repeating units constituting the main backbone chain, the content of the (meth)acryloyl group was 80 mol % of the amount of the terminals, and the content of the 2-ethylhexyl group was 20 mol % of the amount of the terminals.

Photocurable Resin A-4

To 10 parts by mass of isophorone diisocyanate, 3.24 parts by mass of 4-HBA and 3.56 parts by mass of decanol (KH Neochem Co., Ltd.; boiling point: 211° C.; hereinafter the same) were added and reacted at 70° C. for 3 hours to obtain an adduct body having an NCO group at one terminal.

To 100 parts by mass of a hydrogenated polybutadiene capped with a hydroxy group 1, 6.59 parts by mass of isophorone diisocyanate was mixed and reacted in a nitrogen atmosphere at 70° C. for 5 hours to obtain a urethane polymer having hydroxy groups at both terminals. When the residual amount of NCO became 0.1% or less, 11.08 parts by mass of the adduct body was added and reacted at 70° C. for 5 hours. When the amount of residual isocyanate became 0.1% or less, the reaction was terminated to obtain a photocurable resin A-4.

In the photocurable resin A-4, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a decyl group at another terminal, the content of the repeating unit represented by Formula (Ia) was 35 mol % of the amount of the repeating units constituting the main backbone chain, the content of the (meth)acryloyl group was 50 mol % of the amount of the terminals, and the content of the decyl group was 50 mol % of the amount of the terminals.

Photocurable Resin A-5

To 100 parts by mass of a hydrogenated polybutadiene capped with a hydroxy group 2 (a straight-chain polymer in which the main backbone chain had the repeating units represented by Formulas (Ia) and (Ib) above, the double line of a dashed line and a solid line was a single bond in Formulas (Ia) and (Ib), and the content of the repeating unit represented by Formula (Ia) was 35 mol % of the amount of the repeating units constituting the main backbone chain, and which had hydroxy groups at both terminals; trade name: HLBH-P3000, available from Cray Valley), 8.8 parts by mass of isophorone diisocyanate was mixed and reacted in a nitrogen atmosphere at 70° C. for 5 hours to obtain a urethane prepolymer having isocyanate groups at both terminals. When the residual amount of NCO became 0.71%, to the urethane prepolymer, 1.33 parts by mass of 4-HBA and 1.33 parts by mass of decanol were added and reacted at 70° C. for 5 hours. When the amount of residual isocyanate became 0.1% or less, the reaction was terminated to obtain a photocurable resin A-5.

In the photocurable resin A-5, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a decyl group at another terminal, the content of the repeating unit represented by Formula (Ia) was 35 mol % of the amount of the repeating units constituting the main backbone chain, the content of the (meth)acryloyl group was 50 mol % of the amount of the terminals, and the content of the decyl group was 50 mol % of the amount of the terminals.

Photocurable Resin A-6

To 100 parts by mass of a hydrogenated polybutadiene capped with a hydroxy group 2, 6.7 parts by mass of hexamethylene diisocyanate (50M-HDI; available from Asahi Kasei Chemicals Corporation) was mixed and reacted in a nitrogen atmosphere at 70° C. for 5 hours to obtain a urethane prepolymer having isocyanate groups at both terminals. When the residual amount of NCO became 0.72%, 1.06 parts by mass of 2-hydroxyethyl acrylate (available from Osaka Organic Chemical Industry Ltd.; hereinafter the same) and 1.45 parts by mass of decanol were added and reacted at 70° C. for 5 hours. When the amount of residual isocyanate became 0.1% or less, the reaction was terminated to obtain a photocurable resin A-6.

In the photocurable resin A-6, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a decyl group at another terminal, the content of the repeating unit represented by Formula (Ia) was 35 mol % of the amount of the repeating units constituting the main backbone chain, the content of the (meth)acryloyl group was 50 mol % of the amount of the terminals, and the content of the decyl group was 50 mol % of the amount of the terminals.

Mixture 1

To 100 parts by mass of a hydrogenated polybutadiene capped with a hydroxy group 2 and 20 parts by mass of hydrogenated polybutadiene capped with a hydroxy group 3 (trade name: GI-2000, available from Nippon Soda Co., Ltd.; the repeating units represented by Formulas (IIa) and (IIb) above were contained, the double line of a dashed line and a solid line was a single bond in Formulas (IIa) and (IIb), and the content of the repeating unit represented by Formula (IIa) was 15 mol % of the amount of the repeating units constituting the main backbone chain, and hydroxy groups were contained at both terminals; hereinafter the same), 11.2 parts by mass of isophorone diisocyanate was blended and reacted in a nitrogen atmosphere at 70° C. for 5 hours to obtain a urethane prepolymer having isocyanate groups at both terminals. When the residual amount of NCO became 0.74%, to the urethane prepolymer, 2.15 parts by mass of 2-hydroxyethyl acrylate and 0.53 parts by mass of butanol were added and reacted at 70° C. for 5 hours. When the amount of residual isocyanate became 0.1% or less, the reaction was terminated to obtain a mixture 1 containing the photocurable resin A-7 and the photocurable resin B-1.

In the photocurable resin A-7, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a butyl group at another terminal, the content of the repeating unit represented by Formula (Ia) was 35 mol % of the amount of the repeating units constituting the main backbone chain, the content of the (meth)acryloyl group was 80 mol % of the amount of the terminals, and the content of the butyl group was 20 mol % of the amount of the terminals.

In the photocurable resin B-1, the main backbone chain had the repeating units represented by Formulas (IIa) and (IIb) above (the double line of a dashed line and a solid line was a single bond in Formulas (IIa) and (IIb)), had a (meth)acryloyl group at one terminal and had a butyl group at another terminal, the content of the repeating unit represented by Formula (IIa) was 15 mol % of the amount of the repeating units constituting the main backbone chain, the content of the (meth)acryloyl group was 80 mol % of the amount of the terminals, and the content of the butyl group was 20 mol % of the amount of the terminals.

Photocurable Resin A-8

To 100 parts by mass of a hydrogenated polybutadiene capped with a hydroxy group 1 (a straight-chain polymer in which the main backbone chain had the repeating units represented by Formulas (Ia) and (Ib) above, the double line of a dashed line and a solid line was a single bond in Formulas (Ia) and (Ib), and the content of the repeating unit represented by Formula (Ia) was 35 mol % of the amount of the repeating units constituting the main backbone chain, and which had hydroxy groups at both terminals; trade name: HLBH-P2000, available from Cray Valley; hereinafter the same), 12.9 parts by mass of isophorone diisocyanate (available from Evonik; hereinafter the same) was mixed and reacted in a nitrogen atmosphere at 70° C. for 5 hours to obtain a urethane prepolymer having isocyanate groups at both terminals. When the residual amount of NCO became 0.99%, to the urethane prepolymer, 3.08 parts by mass of 4-hydroxybutyl acrylate (4-HBA; available from Osaka Organic Chemical Industry Ltd.; hereinafter the same) and 0.63 parts by mass of ethylene glycol monobutyl ether (available from Tokyo Chemical Industry Co., Ltd.; boiling point: 171° C.; hereinafter the same) were added and reacted in the condition at 70° C. for 5 hours. When the amount of residual isocyanate became 0.1% or less, the reaction was terminated to obtain a photocurable resin A-8.

In the photocurable resin A-8, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a butoxyethyl group at another terminal, the content of the repeating unit represented by Formula (Ia) was 35 mol % of the amount of the repeating units constituting the main backbone chain, the content of the (meth)acryloyl group was 80 mol % of the amount of the terminals, and the content of the butoxyethyl group was 20 mol % of the amount of the terminals.

Photocurable Resin A-9

To 10 parts by mass of isophorone diisocyanate, 5.19 parts by mass of 4-HBA and 1.06 parts by mass of ethylene glycol monobutyl ether were added and reacted at 70° C. for 3 hours to obtain an adduct body having an NCO group at one terminal.

To 100 parts by mass of a hydrogenated polybutadiene capped with a hydroxy group 1, 6.59 parts by mass of isophorone diisocyanate was mixed and reacted in a nitrogen atmosphere at 70° C. for 5 hours to obtain a urethane polymer having hydroxy groups at both terminals. When the residual amount of NCO became 0.1% or less, 10.72 parts by mass of the adduct body was added and reacted in the condition at 70° C. for 5 hours. When the amount of residual isocyanate became 0.1% or less, the reaction was terminated to obtain a photocurable resin A-9.

In the photocurable resin A-9, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a 2-butoxyethyl group at another terminal, the content of the repeating unit represented by Formula (Ia) was 35 mol % of the amount of the repeating units constituting the main backbone chain, the content of the (meth)acryloyl group was 80 mol % of the amount of the terminals, and the content of the 2-butoxyethyl group was 20 mol % of the amount of the terminals.

Photocurable Resin A-10

To 100 parts by mass of a hydrogenated polybutadiene capped with a hydroxy group 1, 12.9 parts by mass of isophorone diisocyanate was mixed and reacted in a nitrogen atmosphere at 70° C. for 5 hours to obtain a urethane prepolymer having isocyanate groups at both terminals. When the residual amount of NCO became 0.99%, to the urethane prepolymer, 3.08 parts by mass of 4-HBA and 0.72 parts by mass of diethylene glycol monoethyl ether (Seahosol (trade name) DG, available from Nippon Shokubai Co., Ltd.; boiling point: 202° C.) were added and reacted in the condition at 70° C. for 5 hours. When the amount of residual isocyanate became 0.1% or less, the reaction was terminated to obtain a photocurable resin A-10.

In the photocurable resin A-10, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a 2-(2-ethoxyethoxy) ethyl group at another terminal, the content of the repeating unit represented by Formula (Ia) was 35 mol % of the amount of the repeating units constituting the main backbone chain, the content of the (meth)acryloyl group was 80 mol % of the amount of the terminals, and the content of the 2-(2-ethoxyethoxy)ethyl group was 20 mol % of the amount of the terminals.

Photocurable Resin A-11

To 10 parts by mass of isophorone diisocyanate, 3.24 parts by mass of 4-HBA and 2.97 parts by mass of 1-butoxy-2-propanol (available from Tokyo Chemical Industry Co., Ltd.; boiling point: 170° C.; hereinafter the same) were added and reacted at 70° C. for 3 hours to obtain an adduct body having an NCO group at one terminal.

To 100 parts by mass of a hydrogenated polybutadiene capped with a hydroxy group 1, 6.59 parts by mass of isophorone diisocyanate was mixed and reacted in a nitrogen atmosphere at 70° C. for 5 hours to obtain a urethane polymer having hydroxy groups at both terminals. When the residual amount of NCO became 0.1% or less, 10.69 parts by mass of the adduct body was added and reacted at 70° C. for 5 hours. When the amount of residual isocyanate became 0.1% or less, the reaction was terminated to obtain a photocurable resin A-11.

In the photocurable resin A-11, the main backbone chain had the repeating units represented by Formulas (Ia) and (Ib) above (the double line of a dashed line and a solid line was a single bond in Formulas (Ia) and (Ib)), had a (meth) acryloyl group at one terminal and had a 1-butoxy-2-propyl group at another terminal, the content of the repeating unit represented by Formula (Ia) was 35 mol % of the amount of the repeating units constituting the main backbone chain, the content of the (meth)acryloyl group was 50 mol % of the amount of the terminals, and the content of the 1-butoxy-2-propyl group was 50 mol % of the amount of the terminals.

Comparative Photocurable Resin E-1

To 100 parts by mass of a hydrogenated polybutadiene capped with a hydroxy group 3 and 70 parts by mass of hydrogenated polybutadiene capped with a hydroxy group 4 (GI-1000, available from Nippon Soda Co., Ltd.; the repeating units represented by Formulas (IIa) and (IIb) above were contained, the double line of a dashed line and a solid line was a single bond in Formulas (IIa) and (IIb), and the content of the repeating unit represented by Formula (IIa) was 15 mol % of the amount of the repeating units constituting the main backbone chain, and hydroxy groups were contained at both terminals), 26.9 parts by mass of isophorone diisocyanate was mixed and reacted in a nitrogen atmosphere at 70° C. for 5 hours. When the residual amount of NCO became 1.7%, to this, 5.8 parts by mass of 4-hydroxybutyl acrylate was added, and when the residual amount of NCO became 0.8%, 1.29 parts by mass of methanol (available from Tokyo Chemical Industry Co., Ltd.; boiling point: 64.7° C.) was added and reacted at 70° C. for 5 hours. When the amount of residual isocyanate became 0.3%, the reaction was terminated to obtain a comparative photocurable resin E-1.

In the comparative photocurable resin E-1, the content of the repeating unit represented by Formula (IIa) was 15 mol % or less of the amount of the repeating units constituting the main backbone chain. Therefore, the comparative photocurable resin E-1 did not correspond to the resin of an embodiment of the present technology.

Comparative Photocurable Resin E-2

To 100 parts by mass of a hydrogenated polybutadiene capped with a hydroxy group 4, 19.2 parts by mass of isophorone diisocyanate was mixed and reacted in a nitrogen atmosphere at 70° C. for 5 hours. When the residual amount of NCO became 2.0%, to this, 3.35 parts by mass of 2-hydroxyethyl acrylate was added, and when the residual amount of NCO became 1.0%, 1.76 parts by mass of isopropanol (available from Tokyo Chemical Industry Co., Ltd.; boiling point: 82.4° C.) was added and reacted at 70° C. for 5 hours to obtain a comparative photocurable resin E-2.

In the comparative photocurable resin E-2, the content of the repeating unit represented by Formula (IIa) was 15 mol % or less of the amount of the repeating units constituting the main backbone chain. Therefore, the comparative photocurable resin E-2 did not correspond to the resin of an embodiment of the present technology.

Comparative Photocurable Resin E-3

100 parts by mass of a hydrogenated polybutadiene capped with a hydroxy group 3 and 11.7 parts by mass of isophorone diisocyanate were mixed and reacted in a nitrogen atmosphere at 70° C. for 5 hours. When the residual amount of NCO became 0.91%, to this, 5.8 parts by mass of 4-hydroxybutyl acrylate was added and reacted. When the residual amount of NCO became 0.1% or less, the reaction was terminated to obtain a comparative photocurable resin E-3.

In the comparative photocurable resin E-3, the content of the repeating unit represented by Formula (IIa) was 15 mol % or less of the amount of the repeating units constituting the main backbone chain, the both terminals have acryloyl groups, and no non-photoreactive groups are contained at terminals. Therefore, the comparative photocurable resin E-3 did not correspond to the resin of an embodiment of the present technology.

Comparative Photocurable Resin E-4

To 100 parts by mass of a hydrogenated polybutadiene capped with a hydroxy group 1, 12.9 parts by mass of isophorone diisocyanate was mixed and reacted in a nitrogen atmosphere at 70° C. for 5 hours to obtain a urethane prepolymer having isocyanate groups at both terminals. When the residual amount of NCO became 0.99%, to this, 3.89 parts by mass of 4-hydroxybutyl acrylate was added and reacted. When the residual amount of NCO became 0.1% or less, the reaction was terminated to obtain a comparative photocurable resin E-4.

In the comparative photocurable resin E-4, the both terminals have acryloyl groups, and no non-photoreactive groups are contained at terminals. Therefore, the comparative photocurable resin E-4 did not correspond to the resin of an embodiment of the present technology.

Production of Composition

The components shown in Table 1 below were used in compositions (part by mass) shown in the same table and mixed by an agitator to produce a composition.

The following evaluations were performed by using the composition produced as described above. The results are shown in Table 1.

Evaluation of Adhesiveness

Initial Adhesion Sample

Two sheets of glass plates (25 mm length, 25 mm width) were prepared, and each of the compositions produced as described above was applied on one glass plate so that the diameter was 5 mm and the adhesion thickness was 0.3 mm. The glass plate and another glass plate were bonded so that they were crossed to each other, and then each of the compositions was cured in the following curing conditions to produce an initial adhesion sample.

Curing Conditions

By using a light irradiation device (GS UV System type S250-01, available from GS Yuasa Lighting Ltd.) and using a metal halide lamp as a light source, irradiation was performed with ultraviolet rays of the wavelength of 250 to 380 nm in a manner that the quantity of light was 150 mW/cm and the integrated quantity of light was 2000 mJ/cm$^2$.

Adhesion Sample after Durability Test

The initial adhesion sample produced as described above was subjected to a durability test in which the initial adhesion sample was placed in a high temperature and high humidity environment of 65° C. and 95% RH for 100 hours to obtain an adhesion sample after durability test.

Measurement of Adhesive Strength

The initial adhesive strength was measured by fixing one of the glass plate of the initial adhesion sample obtained as described above and then subjecting the other glass plate to a tensile testing at the tensile testing rate of 5 mm/min. The maximum value at the time when the glass plates were separated was used as the adhesive strength.

The adhesive strength was also measured in the same manner for the adhesion sample after durability test to obtain the adhesive strength after 65° C. and 95%.

Adhesive Strength Retention Rate

The adhesive strength retention rate was determined by the following equation.

Adhesive strength retention rate (%)=(adhesive strength after 65° C. and 95%/initial adhesive strength)×100

A higher adhesive strength retention rate indicates superior adhesiveness.

Evaluation of Weather Resistance

The weather resistance was evaluated by yellowness index (YI).

Weather Resistance Test

In accordance with JIS K 7350-2, the initial adhesion sample obtained as described above was subjected to weathering test in which the sample was irradiated with light using a xenon weather meter for 100 hours in the following conditions: the wavelength from 300 to 400 nm, the irradiance of 180 W/m$^2$, the black panel temperature of 83° C., and the humidity of 50% RH.

YI Evaluation

In accordance with JIS K 7373:2006, for the sample described above, YI was measured before and after the weathering test.

When YIs before and after the weathering test were compared, a smaller increase of YI indicates excellent weather resistance.

TABLE 1

|  | Example | | | | | | | |
|---|---|---|---|---|---|---|---|---|
|  | 1 | 2 | 3 | 4 | 5 | 6 | 7 | 8 |
| Photocurable resin A-1 | 50 | | | | | | | |
| Photocurable resin A-2 | | 100 | | | | | | |
| Photocurable resin A-3 | 50 | | 50 | | | | | |
| Photocurable resin A-4 | | | 50 | 100 | | | | |
| Photocurable resin A-5 | | | | | 100 | | | |
| Photocurable resin A-6 | | | | | | 100 | | |
| Photocurable resin A-8 | | | | | | | | 100 |
| Photocurable resin A-9 | | | | | | | | |
| Photocurable resin A-10 | | | | | | | | |
| Mixture 1 (including photocurable resin A-7) | | | | | | | 100 | |
| Monofunctional (meth)acrylate 1 | 30 | 30 | 30 | 15 | | | | 30 |
| Monofunctional (meth)acrylate 2 | | | | 15 | 15 | 15 | 15 | |
| Monofunctional (meth)acrylate 3 | | | | | 15 | 15 | 15 | |
| Comparative photocurable resin E-1 | | | | | | | | |
| Comparative photocurable resin E-2 | | | | | | | | |
| Comparative photocurable resin E-3 | | | | | | | | |
| Comparative photocurable resin E-4 | | | | | | | | |
| Photopolymerization initiator 1 | 3 | 3 | 3 | 3 | 3 | 3 | 3 | 3 |
| Plasticizer 1 | 20 | 20 | 10 | 10 | | | | 10 |
| Plasticizer 2 | | | | | 10 | 10 | 10 | |
| Initial adhesive strength/MPa | 1.2 | 1.23 | 1.23 | 1.1 | 1.28 | 1.12 | 1.12 | 1.23 |
| Adhesive strength after 65° C. and 95%/MPa | 1.15 | 1.19 | 1.2 | 1.05 | 1.18 | 1.05 | 1.06 | 1.16 |
| Adhesive strength retention rate (%) | 95.83 | 96.75 | 97.56 | 95.45 | 92.19 | 93.75 | 94.64 | 94.31 |
| Initial YI | 0.23 | 0.22 | 0.22 | 0.2 | 0.25 | 0.24 | 0.24 | 0.23 |
| YI after weathering test | 0.5 | 0.36 | 0.32 | 0.35 | 0.36 | 0.3 | 0.34 | 0.51 |

|  | Example | | | Comparative Example | | | |
|---|---|---|---|---|---|---|---|
|  | 9 | 10 | 11 | 1 | 2 | 3 | 4 |
| Photocurable resin A-1 | | | | | | | |
| Photocurable resin A-2 | | | | | | | |
| Photocurable resin A-3 | | | 50 | | | | |
| Photocurable resin A-4 | | | | | | | |
| Photocurable resin A-5 | | | | | | | |
| Photocurable resin A-6 | | | | | | | |
| Photocurable resin A-8 | | | 50 | | | | |
| Photocurable resin A-9 | 100 | | | | | | |
| Photocurable resin A-10 | | 100 | | | | | |
| Mixture 1 (including photocurable resin A-7) | | | | | | | |
| Monofunctional (meth)acrylate 1 | 30 | 30 | 30 | 30 | 30 | 30 | 30 |
| Monofunctional (meth)acrylate 2 | | | | | | | |
| Monofunctional (meth)acrylate 3 | | | | | | | |
| Comparative photocurable resin E-1 | | | | 100 | 50 | | |
| Comparative photocurable resin E-2 | | | | | 50 | | |
| Comparative photocurable resin E-3 | | | | | | 100 | |
| Comparative photocurable resin E-4 | | | | | | | 100 |
| Photopolymerization initiator 1 | 3 | 3 | 3 | 3 | 3 | 3 | 3 |
| Plasticizer 1 | 10 | 10 | 10 | 50 | 10 | 10 | 10 |
| Plasticizer 2 | | | | | | | |
| Initial adhesive strength/MPa | 1.22 | 1.15 | 1.25 | 1.25 | 1.1 | 0.8 | 0.9 |
| Adhesive strength after 65° C. and 95%/MPa | 1.19 | 1.08 | 1.15 | 1.05 | 0.95 | 0.5 | 0.55 |
| Adhesive strength retention rate (%) | 97.54 | 93.91 | 92.00 | 84.00 | 86.36 | 62.50 | 61.11 |
| Initial YI | 0.23 | 0.23 | 0.22 | 0.23 | 0.22 | 0.22 | 0.21 |
| YI after weathering test | 0.31 | 0.35 | 0.35 | 1.68 | 1.54 | 0.32 | 0.31 |

Details of the components described in Table 1 are as follows.

Photocurable resins A1 to 6 and 8 to 10: the photocurable resins produced as described above Mixture 1: the mixture produced as described above Monofunctional (meth)acrylate 1: dicyclopentenyl acrylate Monofunctional (meth)acrylate 2: isobornyl acrylate Monofunctional (meth)acrylate 3: isodecyl acrylate Comparative photocurable resins E-1 to 4: Comparative photocurable resins produced as described above Photopolymerization initiator 1: IRGACURE 184 (available from BASF)

Plasticizer 1: polyethylene glycol di-2-ethylhexanoate Liquid at room temperature (trade name: TegMeR 804, available from Hallstar)

Plasticizer 2: polyethylene wax. Liquid at room temperature. Versaflow EV (available from Shamrock Technologies, Inc.)

As is clear from the results shown in Table 1, each of Comparative Examples 1 to 3, in which the predetermined photocurable resin was not contained but a photocurable resin, in which the content of the repeating unit represented by Formula (Ia) was not in the particular range, was contained, exhibited a low adhesive strength retention ratio and poor adhesiveness. Furthermore, each of Comparative Examples 1 and 2 could not suppress the increase in YI after the durability test and exhibited poor weather resistance.

Each of Comparative Examples 3 and 4, in which the predetermined photocurable resin was not contained but contained a photocurable resin having no non-photoreactive group, exhibited a low adhesive strength retention ratio and poor adhesiveness.

On the other hand, the compositions of an embodiment of the present technology exhibited high adhesive strength retention ratios and excellent adhesiveness.

Furthermore, the compositions of an embodiment of the present technology were capable of suppressing the increase of YI after the durability test and exhibited excellent weather resistance.

The invention claimed is:

1. A photocurable resin comprising:
a main backbone chain having repeating units represented by Formulas (Ia) and (Ib), and a (meth)acryloyl group and a non-photoreactive group at terminals;
the non-photoreactive group being at least one type selected from the group consisting of saturated hydrocarbon groups and aromatic hydrocarbon groups which optionally have a heteroatom;
a hydroxy group, an amino group, —CH=NH, a carboxy group, or a mercapto group being not bonded to an end of the non-photoreactive group;
a content of the repeating unit represented by Formula (Ia) being greater than 15 mol % of an amount of the repeating units constituting the main backbone chain;
a content of the (meth)acryloyl group being 5 mol % or greater of an amount of the terminals; and
a content of the non-photoreactive group being 5 mol % or greater of the amount of the terminals:

(Ia)

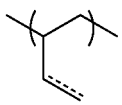
(Ib)

wherein, a double line of a dashed line and a solid line represents a single bond or a double bond.

2. The photocurable resin according to claim 1, wherein the non-photoreactive group is a saturated hydrocarbon group which optionally has an ether bond.

3. The photocurable resin according to claim 1, wherein the non-photoreactive group is formed from at least one type of hydroxy compound selected from the group consisting of
a monofunctional alcohol,
a saturated hydrocarbon compound having one hydroxy group and a heteroatom, and
an aromatic hydrocarbon compound having one hydroxy group and optionally having a heteroatom; and
a boiling point of the hydroxy compound is 100° C. or higher, where the heteroatom does not form a hydroxy group, an amino group, —CH=NH, a carboxy group, or a mercapto group at an end of the saturated hydrocarbon compound or the aromatic hydrocarbon compound.

4. The photocurable resin according to claim 1, wherein the content of the repeating unit represented by Formula (Ia) is 35 mol % or less of the amount of the repeating units constituting the main backbone chain.

5. A mixture comprising:
the photocurable resin described in claim 1; and
a photocurable resin B comprising: a main backbone chain having repeating units represented by Formulas (IIa) and (IIb), and a (meth)acryloyl group and a non-photoreactive group at terminals;
the non-photoreactive group being at least one type selected from the group consisting of saturated hydrocarbon groups and aromatic hydrocarbon groups which optionally have a heteroatom;
a hydroxy group, an amino group, —CH=NH, a carboxy group, or a mercapto group being not bonded to an end of the non-photoreactive group;
a content of the repeating unit represented by Formula (IIa) being 15 mol % or less of an amount of the repeating units constituting the main backbone chain;
a content of the (meth)acryloyl group being 5 mol % or greater of an amount of the terminals; and
a content of the non-photoreactive group being 5 mol % or greater of the amount of the terminals:

(IIa)

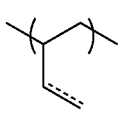
(IIb)

wherein, a double line of a dashed line and a solid line represents a single bond or a double bond.

6. A photocurable resin composition comprising: the photocurable resin described in claim 1, a monofunctional (meth)acrylate, a photopolymerization initiator, and a plasticizer.

7. The photocurable resin composition according to claim 6, further comprising a photocurable resin B;
the photocurable resin B comprising: a main backbone chain having repeating units represented by Formulas (IIa) and (IIb), and a (meth)acryloyl group and a non-photoreactive group at terminals;
the non-photoreactive group being at least one type selected from the group consisting of saturated hydrocarbon groups and aromatic hydrocarbon groups which optionally have a heteroatom;
a hydroxy group, an amino group, —CH=NH, a carboxy group, or a mercapto group being not bonded to an end of the non-photoreactive group;
a content of the repeating unit represented by Formula (IIa) being 15 mol % or less of an amount of the repeating units constituting the main backbone chain;
a content of the (meth)acryloyl group being 5 mol % or greater of an amount of the terminals; and
a content of the non-photoreactive group being 5 mol % or greater of the amount of the terminals:

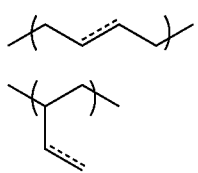

wherein, a double line of a dashed line and a solid line represents a single bond or a double bond.

8. The photocurable resin according to claim 2, wherein the non-photoreactive group is formed from at least one type of hydroxy compound selected from the group consisting of
a monofunctional alcohol,
a saturated hydrocarbon compound having one hydroxy group and a heteroatom, and
an aromatic hydrocarbon compound having one hydroxy group and optionally having a heteroatom; and
a boiling point of the hydroxy compound is 100° C. or higher, where the heteroatom does not form a hydroxy group, an amino group, —CH=NH, a carboxy group, or a mercapto group at an end of the saturated hydrocarbon compound or the aromatic hydrocarbon compound.

9. The photocurable resin according to claim 2, wherein the content of the repeating unit represented by Formula (Ia) is 35 mol % or less of the amount of the repeating units constituting the main backbone chain.

10. The photocurable resin composition according to claim 3, wherein the content of the repeating unit represented by Formula (Ia) is 35 mol % or less of the amount of the repeating units constituting the main backbone chain.

11. The mixture according to claim 5, wherein the non-photoreactive group is a saturated hydrocarbon group which optionally has an ether bond photocurable resin.

12. The mixture according to claim 5, wherein the non-photoreactive group is formed from at least one type of hydroxy compound selected from the group consisting of
a monofunctional alcohol,
a saturated hydrocarbon compound having one hydroxy group and a heteroatom, and
an aromatic hydrocarbon compound having one hydroxy group and optionally having a heteroatom; and
a boiling point of the hydroxy compound is 100° C. or higher, where the heteroatom does not form a hydroxy group, an amino group, —CH=NH, a carboxy group, or a mercapto group at an end of the saturated hydrocarbon compound or the aromatic hydrocarbon compound.

13. The mixture according to claim 5, wherein the content of the repeating unit represented by Formula (Ia) is 35 mol % or less of the amount of the repeating units constituting the main backbone chain.

14. The photocurable resin composition according to claim 6, wherein the non-photoreactive group is a saturated hydrocarbon group which optionally has an ether bond photocurable resin.

15. The photocurable resin composition according to claim 6, wherein the non-photoreactive group is formed from at least one type of hydroxy compound selected from the group consisting of
a monofunctional alcohol,
a saturated hydrocarbon compound having one hydroxy group and a heteroatom, and
an aromatic hydrocarbon compound having one hydroxy group and optionally having a heteroatom; and
a boiling point of the hydroxy compound is 100° C. or higher, where the heteroatom does not form a hydroxy group, an amino group, —CH=NH, a carboxy group, or a mercapto group at an end of the saturated hydrocarbon compound or the aromatic hydrocarbon compound.

16. The photocurable resin composition according to claim 6, wherein the content of the repeating unit represented by Formula (Ia) is 35 mol % or less of the amount of the repeating units constituting the main backbone chain.

17. The photocurable resin composition according to claim 14, further comprising a photocurable resin B;
the photocurable resin B comprising: a main backbone chain having repeating units represented by Formulas (IIa) and (IIb), and a (meth)acryloyl group and a non-photoreactive group at terminals;
the non-photoreactive group being at least one type selected from the group consisting of saturated hydrocarbon groups and aromatic hydrocarbon groups which optionally have a heteroatom;
a hydroxy group, an amino group, —CH=NH, a carboxy group, or a mercapto group being not bonded to an end of the non-photoreactive group;
a content of the repeating unit represented by Formula (IIa) being 15 mol % or less of an amount of the repeating units constituting the main backbone chain;
a content of the (meth)acryloyl group being 5 mol % or greater of an amount of the terminals; and
a content of the non-photoreactive group being 5 mol % or greater of the amount of the terminals:

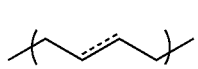

wherein, a double line of a dashed line and a solid line represents a single bond or a double bond.

18. The photocurable resin composition according to claim 15, further comprising a photocurable resin B;

the photocurable resin B comprising: a main backbone chain having repeating units represented by Formulas (IIa) and (IIb), and a (meth)acryloyl group and a non-photoreactive group at terminals;

the non-photoreactive group being at least one type selected from the group consisting of saturated hydrocarbon groups and aromatic hydrocarbon groups which optionally have a heteroatom;

a hydroxy group, an amino group, —CH=NH, a carboxy group, or a mercapto group being not bonded to an end of the non-photoreactive group;

a content of the repeating unit represented by Formula (IIa) being 15 mol % or less of an amount of the repeating units constituting the main backbone chain;

a content of the (meth)acryloyl group being 5 mol % or greater of an amount of the terminals; and a content of the non-photoreactive group being 5 mol % or greater of the amount of the terminals:

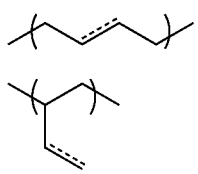

wherein, a double line of a dashed line and a solid line represents a single bond or a double bond.

19. The photocurable resin composition according to claim 16, further comprising a photocurable resin B;

the photocurable resin B comprising: a main backbone chain having repeating units represented by Formulas (IIa) and (IIb), and a (meth)acryloyl group and a non-photoreactive group at terminals;

the non-photoreactive group being at least one type selected from the group consisting of saturated hydrocarbon groups and aromatic hydrocarbon groups which optionally have a heteroatom;

a hydroxy group, an amino group, —CH=NH, a carboxy group, or a mercapto group being not bonded to an end of the non-photoreactive group;

a content of the repeating unit represented by Formula (IIa) being 15 mol % or less of an amount of the repeating units constituting the main backbone chain;

a content of the (meth)acryloyl group being 5 mol % or greater of an amount of the terminals; and a content of the non-photoreactive group being 5 mol % or greater of the amount of the terminals:

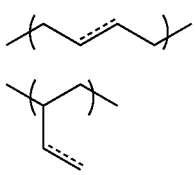

wherein, a double line of a dashed line and a solid line represents a single bond or a double bond.

* * * * *